(12) United States Patent
Kennaley et al.

(10) Patent No.: US 7,266,566 B1
(45) Date of Patent: Sep. 4, 2007

(54) DATABASE MANAGEMENT SYSTEM

(75) Inventors: Timothy A. Kennaley, Peterborough (CA); Richard J. Mutton, Peterborough (CA); Kevin P. Breese, Peterborough (CA); John L. Dunn, Ottawa (CA)

(73) Assignee: Breken Technologies Group (CA)

( * ) Notice: Subject to any disclaimer, the term of this patent is extended or adjusted under 35 U.S.C. 154(b) by 339 days.

(21) Appl. No.: 11/050,821

(22) Filed: Jan. 27, 2005

Related U.S. Application Data

(60) Provisional application No. 60/539,323, filed on Jan. 28, 2004.

(51) Int. Cl.
   *G06F 17/00* (2006.01)
(52) U.S. Cl. .................... 707/102; 707/3; 707/101
(58) Field of Classification Search ............ 707/3, 707/101, 102, 104.1
   See application file for complete search history.

(56) References Cited

U.S. PATENT DOCUMENTS

| | | | |
|---|---|---|---|
| 5,855,014 A | 12/1998 | Smith | |
| 5,944,769 A | 8/1999 | Musk et al. | |
| 6,189,003 B1 | 2/2001 | Leal | |
| 6,208,998 B1 | 3/2001 | Marcus | |
| 6,523,021 B1 | 2/2003 | Monberg et al. | |
| 2003/0163403 A1* | 8/2003 | Chen et al. | 705/36 |
| 2005/0075962 A1* | 4/2005 | Dunne | 705/36 |
| 2005/0155023 A1* | 7/2005 | Li et al. | 717/140 |

* cited by examiner

*Primary Examiner*—Sana Al-Hashemi
(74) *Attorney, Agent, or Firm*—Katten Muchin Rosenman LLP

(57) ABSTRACT

A method of creating a database and of providing results from a database, for use by a municipality, and operating a community database, comprises the steps of: providing first and second source databases addressable under first and second data protocols respectively, which protocols are incompatible one with the other; transforming, comparing and reconciling the data in the first and second source databases in order to optimize each field of data in each record; and storing the optimized data for each record as a record in a resulting master database. Records from searches are presented in order of recency. The present invention also provides a method of generating revenue from activities associated with a community.

18 Claims, 20 Drawing Sheets

"Butler Creek Antiques","","550 County Road 1","","R.R.#8","","Picton","","Ontario","",
"","NULL",""     </center>","","NULL"
"Past Reflections Antiques and Collectables","","County Road
10","","NULL","","Milford","","Ontario","","|       )","",
"","NULL","","NULL","","NULL"
"Trillium House Antiques","","LOcated 5 km West of Cherry Valley<br>on County Road
No. 18 (#983)","","NULL","","Cherry Valley","","Ontario","","NULL","",
5939","","NULL","","NULL","","NULL"
"Manor on Loyalist Parkway","","13468 Loyalist Parkway","","NULL","","Picton","","ON",:;
0","","    ","     ","","NULL","","NULL"
"Bloomfield Preschool","","NULL","","NULL","","Bloomfield","","NULL","","NULL","",
"","NULL","","NULL"
:Enhanced Child Care Support Program, throughout Prince
Edwar","","NULL","","NULL","","NULL","","NULL","","null","","NULL","",
"","NULL","","NULL"

FIG. 3

| Org Name | Address 1 | Address 2 | City | Province | Postal | Phone | Ext | Toll Free | Fax | Email |
|---|---|---|---|---|---|---|---|---|---|---|
| A&P | 73 Main St. | | Picton | ON | | | | | | |
| Abbott Agency Inc. | 42 Mary St. | | Picton | ON | | | | | | |
| ABC Cottages | 10 Cowan Rd. (Sal... | | Cherry Valley | ON | | | | | | |
| Accommodating Bay Trailer Park | R.R. #2 | | Milford | ON | | | | | | |
| Added Touch (Not just for Women) | 149 Main St. | | Picton | ON | | | | | | |
| Alley Cats | 251 Main St. | | Picton | ON | | | | | | |
| Allisonville Conservation Area | | | Consecon | ON | | | | | | |
| Alternatives for Women | Box 1360 | 82 King Street | Picton | ON | | | | | | |
| Sneider Food | 123 Bay Street | | Picton | ON | K0K 2T0 | (613) 123-4567 | | | (613) 123-5678 | email@a... |

FIG. 4

| ID | SEQ | name | gen_phone_number | gen_fax_phone_number | gen_toll_phone_number | street_address | street_street | street_street | street_city | street_province |
|---|---|---|---|---|---|---|---|---|---|---|
| 1428 | 4 | A&P | | | | | 73 Main St. | | Picton | ON |
| 1429 | 4 | Abbott Age... | | | | | 42 Mary St. | | Picton | ON |
| 1430 | 4 | ABC Cottage | | | | | 10 Cowan Rd. (Sal... | | Cherry Valle... | ON |
| 1431 | 4 | Accommoda... | | | | | R.R. #2 | | Milford | ON |
| 1432 | 4 | Addred Touc... | | | | | 149 Main St. | | Picton | ON |
| 1433 | 4 | Alley Cats | | | | | 251 Main St. | | Picton | ON |
| 1434 | 4 | Allisonville C... | | | | | | | Consecon | ON |
| 1435 | 4 | Alternatives | | | | | Box 1360 | 82 King Str... | Picton | ON |
| 1436 | 4 | Sneider Food | (613) 123-4567 | (613) 123-5478 | | | 123 Bay Street | | Picton | ON |

FIG. 5a

| street_postal | street_country | street_region | mail_street | mail_street_s | mail_city | mail_province | mail_postal | mail_country | mail_region | email_address |
|---|---|---|---|---|---|---|---|---|---|---|
| | Canada | Prince Edward... | 73 Main St. | | Picton | ON | | Canada | Prince Edward County | |
| | Canada | Prince Edward... | 42 mary St. | | Picton | ON | | Canada | Prince Edward County | |
| | Canada | Prince Edward... | 10 Cowan Rd. (Sa... | | Cherry Valley | ON | | Canada | Prince Edward County | |
| | Canada | Prince Edward... | R.R. #2 | | Milford | ON | | Canada | Prince Edward County | |
| | Canada | Prince Edward... | 149 Main St. | | Picton | ON | | Canada | Prince Edward County | |
| | Canada | Prince Edward... | 251 main St. | | Picton | ON | | Canada | Prince Edward County | |
| | Canada | Prince Edward... | Box 1360 | 82 King Street | Consecon | ON | | Canada | Prince Edward County | |
| K0K 2T0 | Canada | Prince Edward... | (613) 123-4567 | 123 Bay St | Picton | ON | K0K 2T0 | Canada | Prince Edward County | email@address.com |

FIG. 5b

| ID | SEQ | name | gen_phone_number | gen_fax_phone_number | gen_toll_phone_number | street_address | street_street | street_street_ | street_city | street_province |
|---|---|---|---|---|---|---|---|---|---|---|
| 1428 | 4 | A&P | | | | | 73 Main St. | | Picton | ON |
| 1429 | 4 | Abbott Agency | | | | | 42 Mary St. | | Picton | ON |
| 1434 | 4 | Allisonville Co... | | | | | | | Consecon | ON |
| 1435 | 4 | Alternatives fo... | | | | | Box 1360 | 82 King Street | Picton | ON |
| 1436 | 4 | Snelder Food | (613) 123-4567 | | (877) 123-4567 | | 123 Bay Street | | Picton | ON |

FIG. 6a

| street_postal | street_country | street_region | mail_street | mail_street_s | mail_city | mail_province | mail_postal | mail_country | mail region | email-address |
|---|---|---|---|---|---|---|---|---|---|---|
| | Canada | Prince Edwar... | 73 Main St. | | Picton | ON | | Canada | Prince Edward County | |
| | Canada | Prince Edwar... | 42 Mary St. | | Picton | ON | | Canada | Prince Edward County | |
| | Canada | Prince Edwar... | Box 1360 | 82 King Street | Consecon | ON | | Canada | Prince Edward County | |
| K0K 2T0 | Canada | Prince Edwar... | | 123 Bay Street | Picton | ON | K0K 2T0 | Canada | Prince Edward County | mail@address.com |

FIG. 6b

| Field Name | Possible Weight | Primary Data | Secondary Data | % Match | Field Value |
|---|---|---|---|---|---|
| Organization Name | 6 | Sneider Food | Sneider | 50% | 3 |
| Street Address | 4 | 123 Bay Street | 123 Bay Street | 100% | 4 |
| Postal Code | 2 | K0K 2T0 | K0K 2T0 | 10% | 2 |
| Phone Number | 4 | (613) 123-4567 | (613) 123-4567 | 100% | 4 |
| Toll Free Number | 3 | (877) 123-4567 | | 0% | 0 |
| Domain Name | 2 | address.com | address.com | 30% | 0.6 |
| Match Value | | | | | 13.6 |

FIG. 7

| ID | SEQ | name | gen_phone_number | gen_fax_phone_number | gen_toll_phone_number | street_address_type | street_street |
|---|---|---|---|---|---|---|---|
| 1428 | 4 | A&P | | | | | 73 Main St. |
| 1429 | 4 | Abbott Agen... | | | | | 42 Mary St. |
| 1430 | 4 | ABC Cottag... | | | | | 10 Cowan Rd. (Sa... |
| 1431 | 4 | Accommoda... | | | | | |
| 1432 | 4 | Added Touc... | | | | | R.R. #2 |
| 1433 | 4 | Alley Cats | | | | | 149 Main St. |
| 1434 | 4 | Allisonville C... | | | | | 251 Main St. |
| 1435 | 4 | Alternatives | | | | | Box 1360 |
| 1436 | 4 | Sneider Foo... | (613) 123-4567 | (613) 123-5678 | (877) 123-4567 | | 123 Bay Street |

FIG. 8a

| street_street_sec | street_city | street_province | street_postal_code | street_country | street_region | mail_street |
|---|---|---|---|---|---|---|
| | Picton | ON | | Canada | Prince Edward County | 73 Main St. |
| | Picton | ON | | Canada | Prince Edward County | 42 Mary St. |
| nt) | Cherry Valley | ON | | Canada | Prince Edward County | 10 Cowan Rd. (Sa... |
| | Milford | ON | | Canada | Prince Edward County | R.R. #2 |
| | Picton | ON | | Canada | Prince Edward County | 149 Main St. |
| | Picton | ON | | Canada | Prince Edward County | 251 Main St. |
| | Consecon | ON | | Canada | Prince Edward County | |
| 82 King Street | Picton | ON | | Canada | Prince Edward County | Box 1360 |
| | Picton | ON | K0K 2T0 | Canada | Prince Edward County | |

| mail_street_sec | mail_city | mail_province | mail_postal_code | mail_country | mail_region |
|---|---|---|---|---|---|
| | Picton | ON | | Canada | Prince Edward County |
| | Picton | ON | | Canada | Prince Edward County |
| nt) | Cherry Valley | ON | | Canada | Prince Edward County |
| | Milford | ON | | Canada | Prince Edward County |
| | Picton | ON | | Canada | Prince Edward County |
| | Picton | ON | | Canada | Prince Edward County |
| | Consecon | ON | | Canada | Prince Edward County |
| 82 King Street | Picton | ON | | Canada | Prince Edward County |
| 123 Bay St. | Picton | ON | K0K 2T0 | Canada | Prince Edward County |

DATABASE MANAGEMENT SYSTEM

REFERENCE TO CO-PENDING APPLICATION

The entire subject matter of U.S. Provisional application Ser. No. 60/539,323 filed Jan. 28, 2004 and entitled DATABASE MANAGEMENT SYSTEM is incorporated by reference. The applicant claims priority benefit under Title 35, United States Code, Section 119(e) of U.S. Provisional application Ser. 60/539,323 filed Jan. 28, 2004 and entitled DATABASE MANAGEMENT SYSTEM.

FIELD OF THE INVENTION

The present invention relates to community directories, and more particularly to community directories used by communities for development.

BACKGROUND OF THE INVENTION

The development of a business directory database is one of the key expectations of economic developers in a municipality or other communities. It provides a vehicle by which individuals and businesses from anywhere can obtain useful and relevant information pertaining to businesses in a municipality and pertaining to the municipality itself. In order for a municipality to progress and grow, it is very important to develop a sophisticated business directory database in order to promote regional development by attracting new businesses into the region, and also to help promote and develop existing local businesses in the region, so that local business prospers and remains in the region.

Historically, municipalities tend to develop business directory databases from information received from the Chamber of Commerce or Tourism Board. Such information is typically the best economic and related demographic data relevant to a region; however, it is not complete and often does not have information that is useful and necessary for businesses wishing to move into a region, such as SIC codes, annual revenues, and so on. Further, this data accumulation and management tends to be done by in-house staff or contracted to third parties to do community surveying and to develop a custom software solution to house this data. Accordingly, this method of gathering and maintaining information is very expensive and most municipalities cannot afford to assemble and maintain a useful current business directory database, due to the amount of work and expense. Indeed, many municipalities virtually ignore the development of a business directory database since they cannot afford to develop and maintain a high quality current business directory database.

It is an object of the present invention to provide a database management system.

SUMMARY OF THE INVENTION

In an embodiment, the present invention provides a computer implemented method of operating a municipal database. This embodiment provides a first source database having data fields, which contain data representative of a plurality of client records for a plurality of clients in a community. A second source database has data fields which contain data representative of a plurality of entity records for a plurality of entities in the community. At least some of the clients of the first source data base are common with corresponding entities in the second source database. Data is compared in a predetermined client record in the first source database with at least one of the entity records in the second source database to determine a correspondence there between. This involves assigning a weighting value to the fields for the predetermined client record in the first source database and to the fields of at least one predetermined entity record in the second source database, calculating a percentage value of a portion of the data in a field of the first source database that matches the data in a corresponding field of the second source database, calculating a field value as a product of the weighting value and the percentage value for each data field for the predetermined client record, summing the field values for the data fields of the predetermined client record to create a match value, and establishing a correspondence based on the match value. For each correspondence, data is reconciled in the first and and/or second source databases to optimize the data in each field of the corresponding client record in the first source database to form a reconciled client record. The reconciled client record is then stored.

Thus, in one of its aspects, the present invention provides a computer implemented method of operating a community database, said method comprising the steps of:

providing a first source database having data fields therein, said data fields containing data representative of a plurality of client records for a plurality of clients in a community;

providing a second source database having data fields therein, said data fields containing data representative of a plurality of entity records for a plurality of entities in the community, wherein at least some of the clients of the first source data base are common with corresponding entities in the second source database;

comparing data in a predetermined client record in the first source database with at least one of the entity records in the second source database to determine a correspondence there between, including the steps of:

assigning a weighting value to the fields for the predetermined client record in the first source database and to the fields of at least one predetermined entity record in the second source database;

calculating a percentage value of a portion of the data in a field of the first source database that matches the data in a corresponding field of the second source database;

calculating a field value as a product of the weighting value and the percentage value for each data field for the predetermined client record;

summing the field values for the data fields of the predetermined client record to create a match value; and establishing a correspondence based on the match value;

and for each correspondence, reconciling the data in the first and and/or second source databases to optimize the data in each field of the corresponding client record in the first source database to form a reconciled client record; and;

storing the reconciled client record.

An embodiment further comprises the step of providing a first interface for a client to access and/or update a corresponding client record.

An embodiment further comprises the step of verifying and/or approving a proposed update to a client record by the client.

An embodiment further comprises the step of collecting a client fee from one or more of the clients, wherein the client fee is graduated according to a level of service provided to the client.

An embodiment further comprises the steps of providing a second interface for one or more users for performing one or more search engine functions in the client records, receiving a search inquiry from at least one of the users, and presenting a listing of client records relevant to the search inquiry.

An embodiment further comprises the step of collecting a user fee from end users, wherein the user fee is graduated according to a level of service provided to the user.

An embodiment further comprises the step of providing a date and/or time stamp for each reconciled client record, updating the date and/or time stamp after an update to the client record; and organizing the listing of records in an order according to a value for each date and/or time stamp.

An embodiment further comprises the step of issuing an invitation to a client to review and/or update a corresponding client record.

An embodiment further comprises the steps of dispatching a plurality of survey messages to a corresponding plurality of clients, providing in each survey message a plurality of answer fields to receive data from the corresponding client, receiving a reply survey message from at least one of said corresponding clients and updating a corresponding client record according to data in one or more of the answer fields.

An embodiment further comprises the steps of providing a portal for the community, and providing the first and/or second interfaces with a skin to correspond visually with the portal.

An embodiment further comprises the step of providing each client record with a user access filter field, providing a filter value to the field; and permitting access to the data in the client record by users corresponding to the filter value.

An embodiment further comprises the step of providing each client record with a plurality of filter fields, a first of the fields corresponding to a first group of users, and a second of the field corresponding to a second group of users, and permitting access to a selected portion of the data in the client record by users according to the first and/or second filter values.

An embodiment further comprises the step of dispatching an update message to one or more users, the update message containing data representative of a message that a client record has been updated, and/or data representative of the updated client record.

In an embodiment, in an event of a correspondence, the method further comprises the steps of dispatching a query message to select a field value corresponding either to a field value in the client record or a corresponding field value in a corresponding entity record, and in the event of an affirmative response to the query message, reconciling the field value for the client record and storing a selection value in a selection field representative thereof.

In an embodiment, in a subsequent event of a correspondence, the method further comprises the steps of reading the selection value and reconciling the field value for the predetermined client record, according to the selection value.

In an embodiment, the query message is dispatched to a client, and/or a user, and/or an agent of the community, such as, for example, an economic developer, an employee or contractor of the economic developer or the like.

An embodiment further comprises the steps of providing the client record with at least one first coordinate field containing data representative of first client coordinate data according to the first filter, and at least one second coordinate field containing second client coordinate data according to the second filter. For instance, the first client coordinate data may include such things as account information and/or password information and other information relevant to one subgroup of the community, such as for example a chamber of commerce of a municipality, while the second coordinate data may include account information and/or password information relevant to another subgroup of the community, such as, for example, an economic developer or other service organization in the municipality.

In another of its aspects, there is provided a computer implemented system for operating a municipal database, comprising:

first source database means having data fields therein, said data fields containing data representative of a plurality of client records for a plurality of clients in a community;

second source database means having data fields therein, said data fields containing data representative of a plurality of entity records for a plurality of entities in the community, wherein at least some of the clients of the first source data base are common with corresponding entities in the second source database;

comparing means for comparing the data for each client record in said first source database means with the data for at least one of the entity records in said second source database means to determine a correspondence between a predetermined client record and a corresponding entity record; said comparing means being operable to:

compare data in a predetermined client record in the first source database with at least one of the entity records in the second source database to determine a correspondence there between, including the steps of:

assign a weighting value to the fields for the predetermined client record in the first source database and the second source database;

calculate a percentage value of a portion of the data in a field of the first source database that matches the data in a data field of the second source database;

calculate a field value as a product of the weighting value and the percentage value for each data field for the predetermined client record;

sum the field values for the data fields of the predetermined client record to create a match value; and establish a correspondence based on the match value;

data reconciliation means being operable, for each correspondence to reconcile the data in the first and and/or second source databases to optimize the data in each field of the corresponding client record in the first source database to form a reconciled client record; and, storage means for storing the reconciled client record.

Thus, in another aspect, the present invention provides a computer implemented method of operating a municipal database, said method comprising the steps of:

providing a first source database having data fields therein, said data fields containing data representative of a plurality of client records for a plurality of clients in a municipality;

providing a second source database having data fields therein, said data fields containing data representative of a plurality of entity records for a plurality of entities in the municipality, wherein at least some of the clients of the first source data base are common with corresponding entities in the second source database;

comparing the data for each client record in said first source database with the data for at least one of the entity records in said second source database to determine a match between each client record and a corresponding entity record;

and for each match, reconciling the data in client and entity records to generate a reconciled client record and, storing the reconciled client record.

In an embodiment, the method further comprises the step of providing a first interface for a client to access and/or update a corresponding client record.

In an embodiment, the method further comprises the step of verifying a proposed update to a client record by the client.

In an embodiment, the method further comprises the step of approving a proposed update to a client record by the client.

In an embodiment, the method further comprises the step of collecting a client fee from one or more of the clients, wherein the client fee is graduated according to a level of service provided to the client.

In an embodiment, the method further comprises the step of providing a second interface for performing one or more search engine functions in the client records for one or more users.

In an embodiment, the method further comprises the step of collecting a user fee from end users, wherein the user fee is graduated according to a level of service provided to the user.

In an embodiment, the method further comprises the steps of receiving a search inquiry from a user, and presenting a listing of client records relevant to the search inquiry.

In an embodiment, the method further comprises the step of providing a date and/or time stamp for each of the client records and updating the date and/or time stamp after an update to the client record.

In an embodiment, the method further comprises the step of organizing the listing of records in an order according to a value for each date and/or time stamp.

In an embodiment, the method further comprises the step of issuing an invitation to a client to review and/or update a corresponding client record.

In an embodiment, the method further comprises the steps of dispatching a plurality of survey messages to a corresponding plurality of clients, providing in each survey message a plurality of answer fields to receive data from the corresponding client, and receiving a reply survey message from at least one of said corresponding clients.

In an embodiment, the method further comprises the step of updating a corresponding client record according to data in one or more of the answer fields.

In an embodiment, the method further comprises the steps of providing a portal for the municipality, and providing the first and/or second interfaces with a skin to correspond visually with the portal.

In an embodiment, the method further comprises the step of providing each client record with a user access filter field, providing a filter value to the field; and permitting access to the data in the client record by users corresponding to the filter value.

In an embodiment, the method further comprises the step of providing each client record with a plurality of filter fields, a first of the fields corresponding to a first group of users, and a second of the filters corresponding to a second group of users, and permitting access to the data in the client record by users corresponding to the first and/or second filter values.

In an embodiment, the method further comprises the step of dispatching an update message to one or more users, the update message containing data representative of a message that a client record has been updated, and/or data representative of the updated client record.

In another of its aspects, the present invention provides a computer implemented system for operating a municipal database, comprising:

first source database means having data fields therein, said data fields containing data representative of a plurality of client records for a plurality of clients in a municipality;

second source database means having data fields therein, said data fields containing data representative of a plurality of entity records for a plurality of entities in the municipality, wherein at least some of the clients of the first source data base are common with corresponding entities in the second source database;

comparing means for comparing the data for each client record in said first source database means with the data for at least one of the entity records in said second source database means to determine a match between each client record and a corresponding entity record; and data reconciliation means for reconciling, with each match, the data in corresponding client and entity records to generate a reconciled client record and, storage means for storing the reconciled client record.

In accordance with another aspect of the present invention there is disclosed a method of creating a database containing data from at least two source databases that are organized under mutually incompatible protocols, comprising the steps of: providing a first source database having data fields therein each addressable under a first data protocol; providing a second source database having data fields therein each addressable under a second data protocol; wherein the first and second data protocols are incompatible one with the other; transforming the data in at least one of the first source database and the second source database to conform to a standard protocol; comparing the data in each record in the first source database with at least one of the records in the second source database to determine a correspondence between each record in the first source database with at least one of the records in the second source database; for each correspondence, reconciling the data in the first source database and the second source database in order to optimize each field of data in each record; and storing the optimized data for each record as a record in a resulting master database.

In accordance with another aspect of the present invention there is disclosed a method of creating a database containing data from at least two source databases, comprising the steps of: providing a first source database having data fields therein; providing a second source database having data fields therein; wherein the first and second databases are incompatible one with the other; comparing the data in each record in the first source database with at least one of the records in the second source database to determine a correspondence between each record in the first source database with at least one of the records in the second source database; for each correspondence, reconciling the data in the first source database and the second source database in order to optimize each field of data in each record; and storing the optimized data for each record as a record in a resulting master database.

In accordance with another aspect of the present invention there is disclosed a method of creating a database for use by a municipality, and containing data from at least two source databases, comprising the steps of: providing a first source database having data fields therein, the data fields containing data related to the municipality and having been collected by the municipality; providing a second source database having data fields therein, the data fields containing data related to the municipality; comparing the data in each record in the first source database with at least one of the records in the second source database to determine a correspondence between each record in the first source database with at least one of the records in the second source database; for each correspondence, reconciling the data in the first source database and the second source database in order to optimize each field of data in each record; and, storing the optimized data for each record as a record in a resulting master database.

In accordance with another aspect of the present invention there is disclosed a method of providing results from a database, comprising the steps of: providing a master database having data fields therein, the database containing records related to clients, and wherein the client records have been updated from data received directly from the clients and wherein each the client record has a time stamp associated with it; receiving a search inquiry from a user related to the client records in the master database; comparing the search inquiry to the client records in the master database; identifying the records in the master database that match the inquiry; and presenting the identified client records from the master database in order of recency as determined by the date stamp.

In accordance with another aspect of the present invention there is disclosed a method of operating a municipal database, comprising the steps of: providing a master database having data fields therein, and wherein the data fields containing data related to the municipality; receiving clients related to the municipal database; providing each client with a client record in the master database; and, verifying and updating, as necessary, the client record for each client.

In accordance with another aspect of the present invention there is disclosed a method of operating a database, comprising the steps of: providing a master database having data fields therein; receiving clients related to the database; providing each client with a client record in the master database; verifying and updating, as necessary, the client record for each client; wherein each the client record has a time stamp associated with it, which time stamp is updated when the client record is updated; and, presenting the identified records from the source database in order of recency as determined by the date stamp, upon receipt of a search inquiry from a user related to the records in the master database.

In accordance with another aspect of the present invention there is disclosed a method of operating a municipal database for use by a municipality, and containing data from at least two source databases, comprising the steps of: providing a first source database having data fields therein, the data fields containing data related to the municipality and having been collected by the municipality; providing a second source database having data fields therein, the data fields containing data related to the municipality; comparing the data in each record in the first source database with at least one of the records in the second source database to determine a correspondence between each record in the first source database with at least one of the records in the second source database; for each correspondence, reconciling the data in the first source database and the second source database in order to optimize each field of data in each record; storing the optimized data for each record as a record in a resulting master database; receiving clients related to the municipal database; and, providing each client with a client record in the master database.

In accordance with another aspect of the present invention there is disclosed a method of generating revenue from activities associated with a municipality, comprising the steps of: providing a master database having data fields therein, and wherein the data fields contain data related to the municipality; receiving clients related to the municipal database; providing each client with a client record in the master database; and, collecting a client fee from each the client having the client record in the master database.

In yet another of its aspects, the present invention provides a computer program product encoded in a computer readable or executable medium or signal including a plurality of computer executable steps for a computer to create a database containing data originating from at least two source databases that are organized under mutually incompatible protocols, said method comprising the steps of:
  providing a first source database having data fields therein each addressable under a first data protocol;
  providing a second source database having data fields therein each addressable under a second data protocol;
  wherein said first and second data protocols are incompatible one with the other;
  transforming the data in at least one of said first source database and said second source database to conform to a standard protocol;
  comparing the data in each record in said first source database with at least one of the records in said second source database to determine a correspondence between each record in said first source database with at least one of the records in said second source database;
  for each said correspondence, reconciling the data in said first source database and said second source database in order to optimize each field of data in each record; and, storing the optimized data for each record as a record in a resulting master database.

In yet another of its aspects, the present invention provides a system for creating a database containing data originating from at least two source databases that are organized under mutually incompatible protocols, comprising the steps of:
  means for providing a first source database having data fields therein each addressable under a first data protocol;
  means for providing a second source database having data fields therein each addressable under a second data protocol;
  wherein said first and second data protocols are incompatible one with the other;
  means for transforming the data in at least one of said first source database and said second source database to conform to a standard protocol;
  means for comparing the data in each record in said first source database with at least one of the records in said second source database to determine a correspondence between each record in said first source database with at least one of the records in said second source database;

wherein for each said correspondence, reconciling the data in said first source database and said second source database in order to optimize each field of data in each record; and, means for storing the optimized data for each record as a record in a resulting master database.

In yet another of its aspects, the present invention provides a server system for creating a database containing data originating from at least two source databases that are organized under mutually incompatible protocols, comprising the steps of:

means for providing a first source database having data fields therein each addressable under a first data protocol;

means for providing a second source database having data fields therein each addressable under a second data protocol;

wherein said first and second data protocols are incompatible one with the other;

means for transforming the data in at least one of said first source database and said second source database to conform to a standard protocol;

means for comparing the data in each record in said first source database with at least one of the records in said second source database to determine a correspondence between each record in said first source database with at least one of the records in said second source database;

wherein for each said correspondence, reconciling the data in said first source database and said second source database in order to optimize each field of data in each record; and, means for storing the optimized data for each record as a record in a resulting master database.

In one embodiment, the server system further comprising means for receiving requests from one or more clients for data contained in the master database.

In yet another of its aspects, the present invention provides a computer program product encoded in a computer readable or executable medium or signal including a plurality of computer executable steps for a computer to create a database containing data originating from at least two source databases that are organized under mutually incompatible protocols, said method comprising the steps of:

providing a first source database having data fields therein each addressable under a first data protocol;

providing a second source database having data fields therein each addressable under a second data protocol;

wherein said first and second data protocols are incompatible one with the other;

transforming the data in at least one of said first source database and said second source database to conform to a standard protocol;

comparing the data in each record in said first source database with at least one of the records in said second source database to determine a correspondence between each record in said first source database with at least one of the records in said second source database;

for each said correspondence, reconciling the data in said first source database and said second source database in order to optimize each field of data in each record; and, storing the optimized data for each record as a record in a resulting master database.

In yet another of its aspects, the present invention provides a system for creating a database containing data originating from at least two source databases that are organized under mutually incompatible protocols, comprising the steps of:

means for providing a first source database having data fields therein each addressable under a first data protocol;

means for providing a second source database having data fields therein each addressable under a second data protocol;

wherein said first and second data protocols are incompatible one with the other;

means for transforming the data in at least one of said first source database and said second source database to conform to a standard protocol;

means for comparing the data in each record in said first source database with at least one of the records in said second source database to determine a correspondence between each record in said first source database with at least one of the records in said second source database;

wherein for each said correspondence, reconciling the data in said first source database and said second source database in order to optimize each field of data in each record; and, means for storing the optimized data for each record as a record in a resulting master database.

In yet another of its aspects, the present invention provides a server system for creating a database containing data originating from at least two source databases that are organized under mutually incompatible protocols, comprising the steps of:

means for providing a first source database having data fields therein each addressable under a first data protocol;

means for providing a second source database having data fields therein each addressable under a second data protocol;

wherein said first and second data protocols are incompatible one with the other;

means for transforming the data in at least one of said first source database and said second source database to conform to a standard protocol;

means for comparing the data in each record in said first source database with at least one of the records in said second source database to determine a correspondence between each record in said first source database with at least one of the records in said second source database;

wherein for each said correspondence, reconciling the data in said first source database and said second source database in order to optimize each field of data in each record; and, means for storing the optimized data for each record as a record in a resulting master database.

In one embodiment, the server system further comprising means for receiving requests from one or more clients for data contained in the master database.

In yet another of its aspects, the present invention provides a computer terminal system for use on a network for maintaining a database containing data originating from at least two source databases that are organized under mutually incompatible protocols, comprising one or more of:

first storage means for providing a first source database having data fields therein each addressable under a first data protocol;

second storage means for providing a second source database having data fields therein each addressable under a second data protocol;

wherein said first and second data protocols are incompatible one with the other;

transformation means for transforming the data in at least one of said first source database and said second source database to conform to a standard protocol;

comparison means for comparing the data in each record in said first source database with at least one of the records in said second source database to determine a correspondence between each record in said first source database with at least one of the records in said second source database;

wherein for each said correspondence, reconciling the data in said first source database and said second source database in order to optimize each field of data in each record;

third storage means for storing the optimized data for each record as a record in a resulting master database; and means for sending and receiving instructions from a server computer in association with one or more of the first, second or third storage means, and/or the comparison means and transformation means.

In yet another of its aspects, the present invention provides a method of creating a database containing data from at least two source databases, the method comprising the steps of:

providing a first source database having first data fields therein to contain data for a plurality of first client records, wherein each data field in the first source database is labelled with a unique first identity code;

providing a second source database having second data fields therein to contain data for a plurality of second client records, wherein each data field in the second source database is labelled with a unique second identity code, wherein at least some of the first and second client records belong to a common client, and wherein at least some of the first identity codes and/or second identity codes are different or incompatible;

transforming the data in the first source database and/or the second source database to a conform to a standard field identity code labelling protocol to form a system formatted database;

comparing the data in each record in the system formatted database with at least one of the records in the first and/or second source databases to determine a correspondence between each record in the system formatted database therewith; and for each said correspondence, reconciling the data in between the system formatted database and the corresponding first or second database to optimize the data in at least one field in the system formatted database.

In one embodiment, the method includes, after the reconciling step, the step of updating the data in the at least one field in the system formatted database.

In yet another of its aspects, the present invention provides a computer terminal system for use on a network for maintaining a database containing data originating from at least two source databases that are organized under mutually incompatible protocols, comprising one or more of:

first storage means for providing a first source database having data fields therein each addressable under a first data protocol;

second storage means for providing a second source database having data fields therein each addressable under a second data protocol;

wherein said first and second data protocols are incompatible one with the other;

transformation means for transforming the data in at least one of said first source database and said second source database to conform to a standard protocol;

comparison means for comparing the data in each record in said first source database with at least one of the records in said second source database to determine a correspondence between each record in said first source database with at least one of the records in said second source database;

wherein for each said correspondence, reconciling the data in said first source database and said second source database in order to optimize each field of data in each record;

third storage means for storing the optimized data for each record as a record in a resulting master database; and means for sending and receiving instructions from a server computer in association with one or more of the first, second or third storage means, and/or the comparison means and transformation means.

In yet another of its aspects, the present invention provides a method of creating a database containing data from at least two source databases, the method comprising the steps of:

providing a first source database having first data fields therein to contain data for a plurality of first client records, wherein each data field in the first source database is labelled with a unique first identity code;

providing a second source database having second data fields therein to contain data for a plurality of second client records, wherein each data field in the second source database is labelled with a unique second identity code, wherein at least some of the first and second client records belong to a common client, and wherein at least some of the first identity codes and/or second identity codes are different or incompatible;

transforming the data in the first source database and/or the second source database to a conform to a standard field identity code labelling protocol to form a system formatted database;

comparing the data in each record in the system formatted database with at least one of the records in the first and/or second source databases to determine a correspondence between each record in the system formatted database therewith; and for each said correspondence, reconciling the data in between the system formatted database and the corresponding first or second database to optimize the data in at least one field in the system formatted database.

In one embodiment, the method further comprises, after the reconciling step, the step of updating the data in the at least one field in the system formatted database.

In one embodiment, the method further comprises the steps of:

providing one or more records and/or one or more fields in each record with one or more filter attributes;

receiving requests from a remote party for data in one or more of said records and/or one or more fields; and responding to one or more of the requests by determining the authority level of the remote party, the authority level being associated with one or more of the filter attributes; and dispatching the requested data only if the authority level of the remote party corresponds to the filter attributes for the corresponding record and/or corresponding field.

While the system is applicable to business directories for communities such as municipalities and regions, it may also be useful for other directories needing one or more of the features described herein, including other communities such as professional associations, government organizations, business enterprises, such as retail organizations which provide portal access both for suppliers and customers and the like.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the method of creating a database, method of providing results from a database, method of operating a database, method of operating a municipal database, and method of generating revenue from activities associated with a municipality according to the present invention, as to their structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 3 is a representation of a first source database for use in the system of FIG. 1;

FIG. 4 is a representation of the first source database after a first manipulation;

FIGS. 5a and 5b are representations of the first source database of FIG. 4 after a second manipulation;

FIGS. 6a and 6b are representations of a second source database for use in the system of FIG. 1;

FIG. 7 is a chart showing a portion of a data reconciliation function;

FIGS. 8a, 8b, 8c and 8d are representations of a master database for use in the system of FIG. 1;

DETAILED DESCRIPTION OF A PREFERRED EMBODIMENT

The entire subject matter of the website accessible through http://www.breken.com/emunicipality.html is incorporated herein by reference. Reference will now be made to FIGS. 1 through 12C, which illustrate a system for data management, particular for municipal applications. The system makes use of a database whose data is assembled from one or more databases whose records are, by some measure, not up to date, not complete or inaccurate. The system provides a number of functions to assemble the database which requires relatively little effort by a representative of a municipality, such as an economic development department or organization related to the municipality (hereinafter referred to as an "Economic Developer"). The system provides a number of subroutines which are operable to organize the one or more databases using a standard format, thereby to undertake a record by record comparison of the databases, then to resolve conflicts in the data, in order to assemble a master database.

The system then makes use of communications between business entities and other community partners whose data may or may not be in one or more records on the database to maintain the integrity of the database. For example, the community partners may participate for reasons other than to contribute data to the database.

Figure 1:
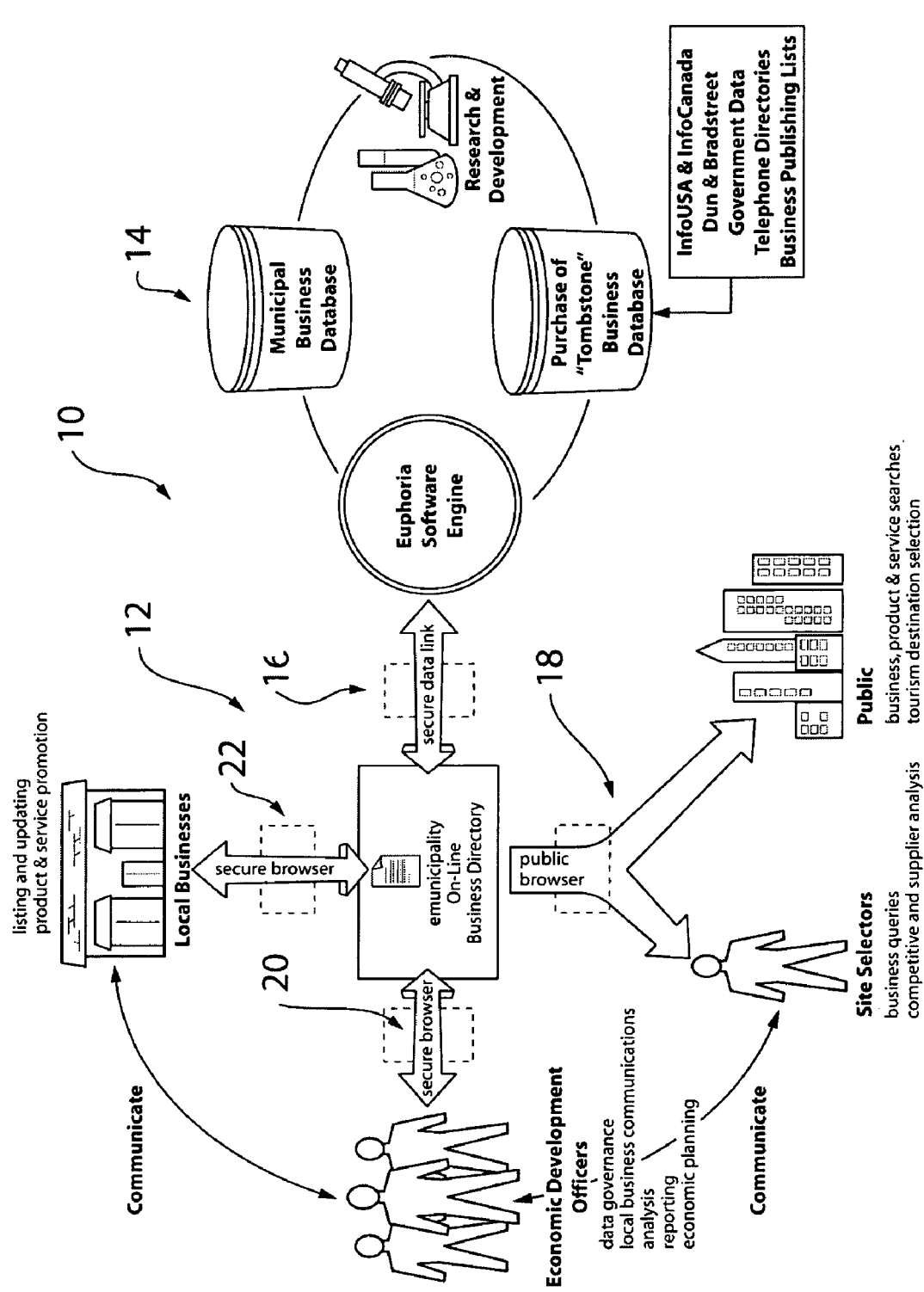
FIG. 1 is an overall diagrammatic view of a database management system.

Referring to FIG. 1, the system employs a computer system 10 providing an online business directory 12 which draws from one or more source data bases 14 from a variety of sources by way of a secure data link 16.

The system provides a front end portal 18 to provide information for a municipality as well as to one or more search engine functions for various third parties to accumulate data from the directory 12. In this case, the system also provides a portal 20 for various community partners whose data is contained in the directory or who have a stake in the ongoing activities of the economic development effort. The system also provides a portal 22 for the business entities or clients, who are featured in the business directory.

Figure 2:
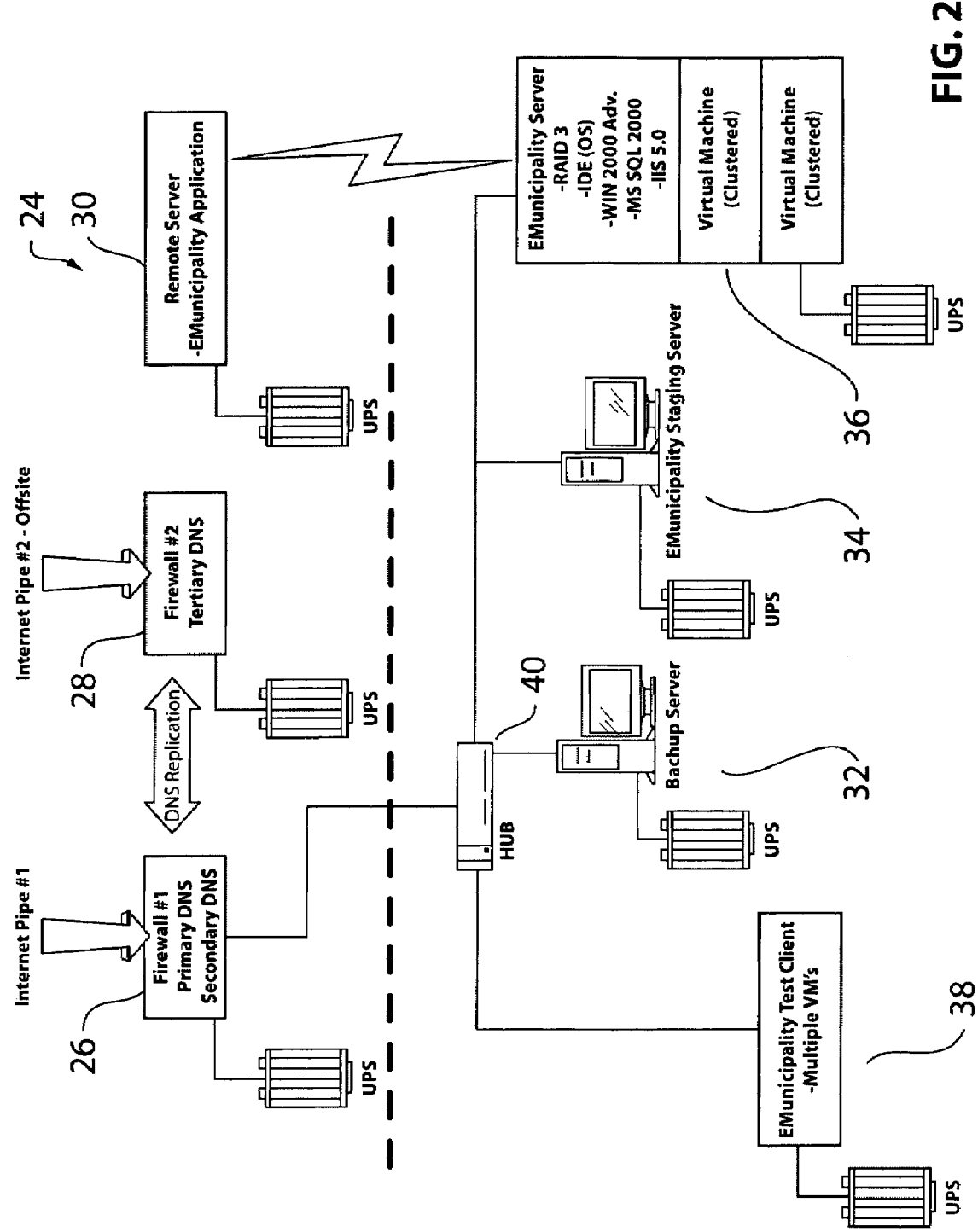
FIG. 2 is an overall diagrammatic view of the hardware and networks used by system of FIG. 1.
Figure 8D:
Figure 9:
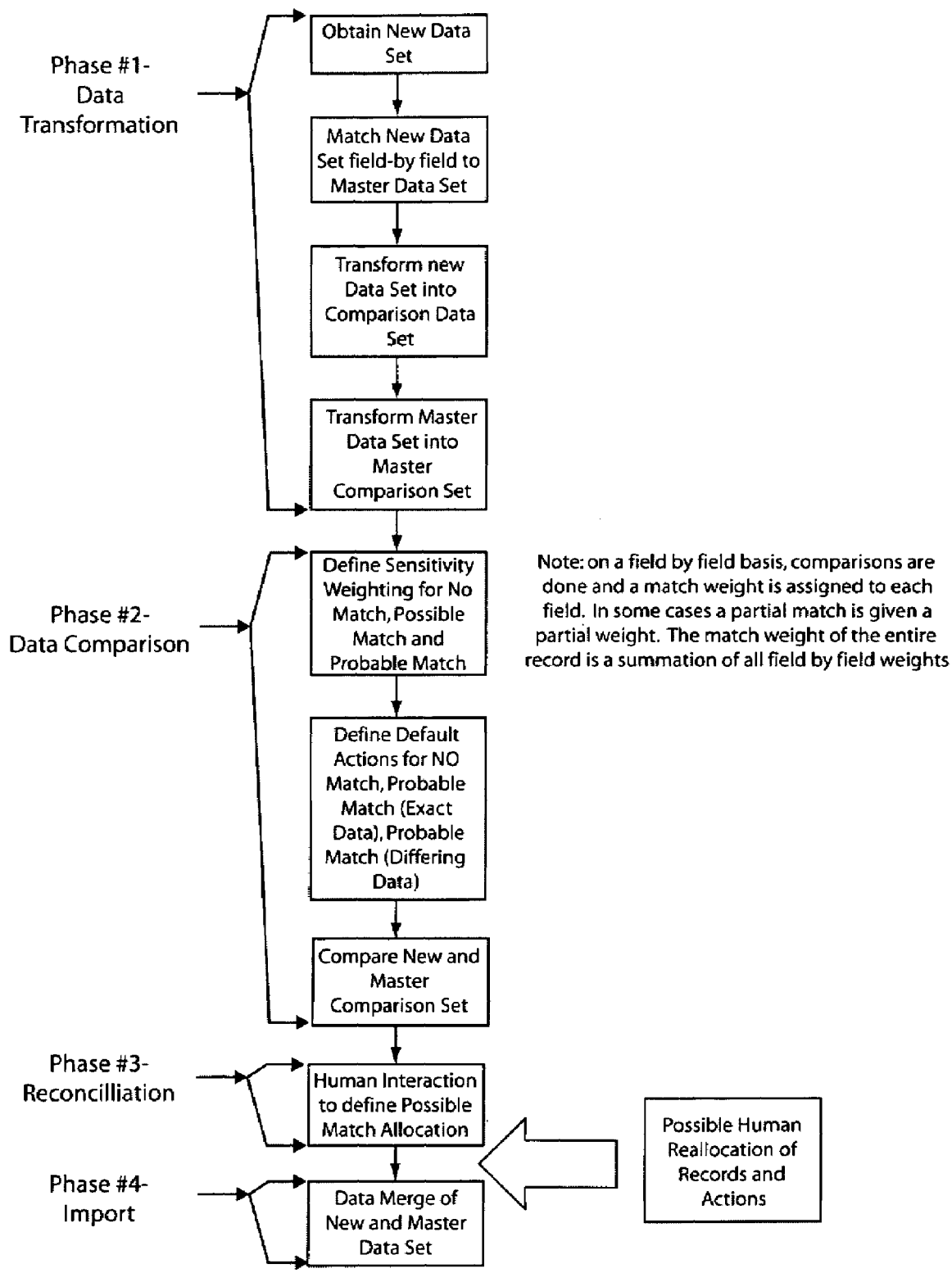
FIG. 9 is a flow chart of a data reconciliation portion of the system of FIG. 1.

Referring to FIG. 2, system 10 is resident in an architecture 24 which includes a pair of redundant firewall modules 26, 28 which themselves have an access port to the internet, a remote server module 30 to run a plurality of applications for carrying out the method herein, as will be described. A pair of backup server modules 32, 34 is also provided to provide backup functions for applications for carrying out the method herein as well as a host server module 36, also to run a plurality of applications. A test terminal module is provided at 38 to allow for ongoing testing of the system. The modules communicate with one another on a local area network under a number of well known protocols, through a wired physical link via a hub module 40.

A first source database (FIG. 3) is provided, having data fields therein each addressable under a first data protocol. The step of providing a first source database includes collecting data from the municipality. Typically, the best economic and related demographic data relevant to a region come from a Chamber of Commerce or Tourism Board. Using existing organization data is very important to ensure the most current, accurate and complete data is in the system. This is important for a number of reasons. Firstly, from a political standpoint, the Municipality is obligated to equally represent and support the businesses and organizations in the community. From the standpoint of a searcher, a directory is not valuable unless it is able to provide a complete set of results. Further, a complete set of data is important to ensure the Municipality's reporting and surveying tools are accurate and complete. Also, a complete set of data provides a greater number of potential clients who will upgrade their database records. Finally, the imported data provides contact information and in many cases email addresses that allow the Municipality to survey and communicate with organizations. In this case, the first source data base is "raw" as can be seen with a variety of coding. The data in the first source database is then scrubbed, by "cleaning" the data in each record by looking for and deleting such things as extraneous characters, quotation marks while checking also for proper formats of such things as telephone and postal codes. This step may be carried out manually or automatically. The transformed data is shown, for example, in FIG. 4. Next the first source data is then imported into the format of the system 10 that is with the proper field labels and the like as shown in FIGS. 5a and 5b. Also, a second source database is provided in FIGS. 6a and 6b having data fields therein each addressable under a second data protocol. The second source database may, for example, be a standard purchased database, and is one that typically is provided by a list service bureau.

The first and second data protocols are usually incompatible one with the other. Further, the first and second databases may also themselves be incompatible one with the other. Thus, the data in at least one of the first source database and the second source database are transformed to conform to a standard protocol, as will now be discussed in greater detail.

The data in each record of the second database are compared in the first system formatted source database of FIGS. 5a and 5b with at least one of the records in the second source database to determine a correspondence between each record in the first source database with at least one of the records in the second source database. For each correspondence between the first source database and the second source database, the data in the first source database and the second source database are reconciled in order to optimize each field of data in each record.

The resulting optimized data for each record are stored as a record in a resulting master database, as can be best seen in FIGS. 8a to 8d. The master database has data fields therein, which fields contain records related to clients. In the example databases, new businesses have been added. The entry for "Sneider Foods" now has additional information (phone numbers).

The step of reconciling the data in the first source database and the second source database includes scrubbing and transforming the data in the first source database and the second source database, as is partially shown between FIGS. 4, 5a and 5b. In the transforming step, the data are manipulated into the system format that will allow reconciliation to continue. Specifically, the fields in the first source database (FIGS. 5a and 5b) and the second source database (FIGS. 6a and 6b) are identified. If any information in these fields is concatenated (meaning connected or linked in a series), it is separated into the appropriate fields in the master database (FIGS. 8a to 8d). The step of identifying the fields of the first source database and the second source database may also comprise a user defined matching process in the event that fields cannot automatically be identified.

The step of reconciling the data in the first source database and the second source database includes indexing the data by setting the data to a comparison standard. Typically, all of the letters in the data are capitalized and short forms of words are amended to their short or full form (e.g. "St." is amended to read "Street" or vice versa).

The step of reconciling the data in the first source database and the second source database may also include assigning a weighting value to the fields in the first source database and the second source database, as can be best seen in FIG. 7. A possible weight is assigned to each data field. For example, weights of 6, 4, and 3 are shown. The portion of the data in the data field of the first source database that matches the data in the data field of the second source database is calculated and expressed as a percentage. Percentage matches of 50%, 0% and 100% are shown. A field value is calculated as the product of the possible weight and the percentage value for each data field for each particular record. The field values of all of the data fields for the particular record are summed to create a match value.

The system is operable to query a user to resolve a conflict. For instance, the system may consider two entries where, in case, the member's name is CIBC and in the other CANADIAN IMPERIAL BANK OF COMMERCE. The system will look at the entities and "weight" the name field as a zero. If the address and phone number fields are equal, then the system reports these two entries represent a potential match and will then check a name association table for a reference for a resolution. If none exists, the system will pose the question: "is CIBC equal to the CANADIAN IMPERIAL BANK OF COMMERCE and will learn from the answer, so that, in the affirmative, the name CIBC will be associated, in memory, in the name association table with CANADIAN IMPERIAL BANK OF COMMERCE.

The system allows for filters to be assigned each record and/or each field in each record according to different rules. For instance, the filter may be an allocation code relating to a different organization, a region field, a province/state code and a country code. Referring to the data reconciliation flowchart of FIG. 9, phase 1 is employed by depressing, in one example, a button labelled "build seed data set" to transform a new dataset into a comparison dataset which imports the scrubbed data into a format that can be compared then build a current data set.

In phase 2, the data is compared between a new record in a new dataset and each record in the comparison dataset. The weighting is then applied. In one example, if the weightings if the numbers add up to 3, there is no match, or some other minimum number, or lower, such as 0, 1 or 2, the new record is considered a "New" record. On the other hand, in one example, if the match weight is anything above 10, then the new record is considered to be a match with another record in the system. For example, it may be beneficial to raise the minimum level from 3 to 4, which may have the effect of missing a few matches, but has the benefit of cutting down the number of records that we have to look at manually. Therefore, in this case, accuracy can be traded off against processing speed. This is applicable in some rural areas where the system may faces matches of a common postal code applied to a common "rural route", whereas an increase of the minimum level to 4 may eliminate this match and the new record would indeed be considered "new".

In the example shown in FIG. 7, the match value is 6. A user defined sensitivity can be created that classifies a value of 3 or less as no match, a value from 4 through 10 as a possible match, and a value of greater than 10 as a positive match. Once the match value is determined, an appropriate action can be performed. For instance, if there is a positive match, the data values that match 100% can be stored in the appropriate field in the master database. For other matches that are not 100%, a user could define which data value is correct.

Over time, the system 10 may acquire or accumulate intelligence of probable versus possible matches, for example by having the ability to analyze the cost/accuracy impact by moving from one minimum level to another, that is by saving a given amount of time but by losing a given amount of accuracy.

This may be of particular interest to Economic Developers who can then tailor the data reconciliation step according to their needs and according to the data being imported. For example, some Economic Developers will want to save money for the sake of accuracy, while other Economic Developers will want to save time.

That time/accuracy balance may also be of value depending on the type of database being imported. For example, if the data base is a manufacturer's database, the Economic Developer may be more interested in 100 percent accuracy than in saving time, whereas if the database relates to service clubs, the Economic Developer may be more interested in saving importing time at the expense of lower accuracy.

Thus the first and second source databases will contain data regarding existing business entities and/or clients of the economic development department in the municipality. However, the databases may also include records not attributable to any one existing business entity and/or client, but may contain general demographic data on such things as numbers of schools, religious institutions, profiles of the workforce and the like, as may be available from government sources such as Statistics Canada and the like. In this case, this general demographic data may be made organized according to a set of fields unique to that general demographic data, as desired.

In addition, the business directory may be used by different organizations for independent functions, and will involve recording perhaps different data for the same "member". Consider the case where a client in the business directory is a member of a Chamber of Commerce and a Service Organization. The chamber of commerce may use the business directory to store such things as the members Chamber account/membership number and perhaps a password for secure access to a private page available only to members. Similarly, the Service Organization may have the same information on the same member, but the information for the chamber is inaccessible to the service organization.

Still further, the Economic Developer may retain employee and revenue information for that member which is off limits to both the chamber of commerce and the service club. And yet, in all cases, the business directory would normally have one record or entry for that member with data fields containing the required data for all three collectively.

This is achieved by assigning a "filter" value to each field in the record and permitting access to those fields by users corresponding to the same filter value. More than one filter value may be attributed to each field, so that one may be for a group of which only those in the group (one group being a Chamber of Commerce and the other a Economic Development Department), one may be for a region, so that all those in the groups of a particular region can see that field, and so on.

Figure 10:
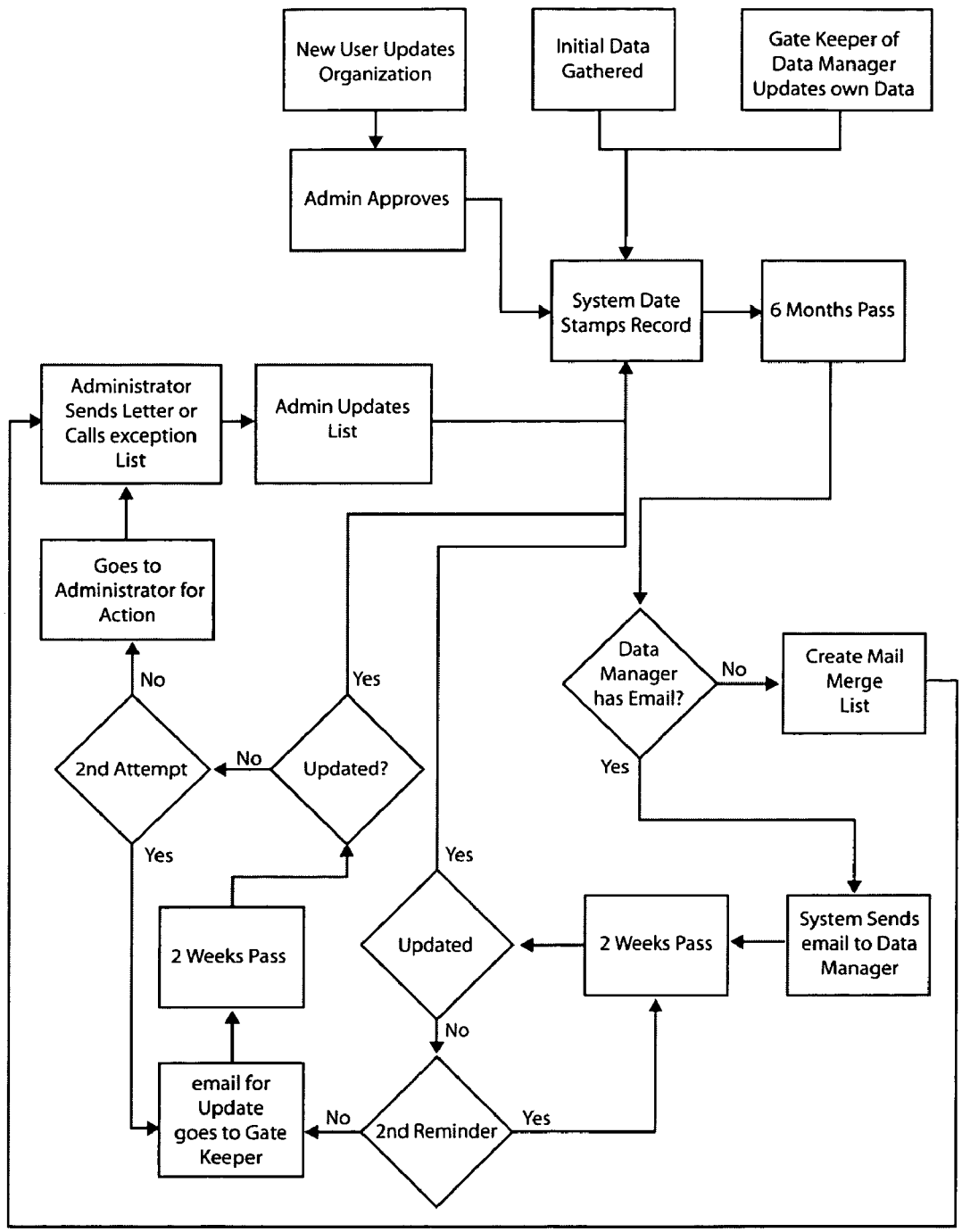
FIG. 10 is a flowchart of a data maintenance process of the system of FIG. 1

As can be best seen in FIG. 10, when the data records are updated, the system date stamps the record. If six months have passed since any database record has been updated, the system checks that the data manager of the client has an e-mail address. If he does not, the mailing address is added to a mail merge list and a letter is mailed to the client. If there is no physical address, but there is a phone number, a telephone call is made to the client. If the e-mail address is known, the system sends an e-mail to the data manager at the e-mail address. In two weeks, the system checks to see if the data have been updated for the data record related to the e-mail that was sent. If it has been updated, the system assures that it has been date stamped. If the data record has not been updated, a second reminder e-mail is sent to the gate keeper, who is perhaps the owner of the business. The system again checks in two weeks to see whether the associated data record has been updated. If it has, then the system ensures the data record is date stamped. If the data record has not been updated, the system checks whether this is a first attempt at sending an e-mail to the gate keeper or a second attempt at sending an e-mail to the gate keeper. If it is a first attempt, a second e-mail is sent to the gate keeper. If it is a second attempt, and still no update has been received, then a letter is generated and mailed to the client.

Clients are permitted, and indeed encouraged, to update the master database records directly themselves, in order to keep the records in the master database current. The client records are updated from data received directly from the clients, typically in real time over the Internet or by any other suitable manner. Preferably, an administrator approves the updates to the master database from the clients, in order to preclude unacceptable data from being entered into the database.

Each client record has a time stamp associated with it, which time stamp is used to indicate the recency of the update of the data records. The time stamp is updated when the client record is updated.

In order to help ensure that the database records are updated regularly, it is possible to issue an invitation to the client to update the records related to the client. Typically, a reminder e-mail or a message in some other appropriate format, such as cell phone text messaging, instant messaging of the type known under the well known trade name MSN, or for that matter a paper letter, a phone call either pre-recorded or otherwise, a facsimile, by fixed or stationary devices such as telephones, cell phones, desktop and laptop computers, personal digital assistants (or PDA's) such as those under the trade names PALM and RIM BLACKBERRY, or the like, is sent out to clients having out-of-date data on the master database. The time stamps are used to determine such out-of-date data.

The system 10 also provides a method of providing results from a database. Upon receipt of a search inquiry from a user related to the client records in the master database, the search inquiry is compared to the client records in the master database, and the records in the master database that match the inquiry are identified. The identified client records from the master database are presented in an order of recency as determined by the date stamp. In this manner, clients who have updated their data most recently are presented first in response to a search inquiry, thus providing incentive for clients to keep their data records current in the master database. Further, such database updates from the clients are forwarded to community partners, for example organizations such as Chambers of Commerce, BIA's, Tourism Associations and other groups that represent numbers of businesses.

The data stored in each record of the master database is presented on a web page that is created for each client. Each client has a choice of a basic web page, an enhanced web page, or a complete web page, as discussed more fully below. A user doing a search inquiry is linked to the appropriate web pages corresponding to the results of the search.

The system 10 also allows for the creation of a survey related in some manner to the data in the database. The survey is sent to at least some of clients in the database, as appropriate. The answer fields in the survey are linked to the master database, such that the master database is updated using the results of the survey. The survey function is useful because it permits representatives in the municipality to create their own surveys within the system which can be useful to add missing information in the data and ask additional questions that are not in our main set of data, relating to data that already exits in the database, for example for additional clarification, qualification or the like. For example, the survey might be used by a municipality to determine certain demographic information on a particular request. For example, consider the case where a company (referred to herein as a "Site Selector") is considering to relocate to a particular region, to process red meat and, in this case, wants to be in a community that supports the red meat industry. A representative of the municipality, looking at the database, sees that there is no data on the demographics of red meat eaters in that region. As a result, the representative implements a survey to the businesses in the region to determine the number of employees that eat red meat. One or more data fields can then be formed, either automatically or manually, to provide suitable and relevant real time data emerging from the survey, as each respondent submits a reply or on a batch basis once all responses have been received.

The system may also be used to ensure that different subsets of data are maintained by the appropriate person or group of persons or automatic subroutine. In this case, the representative sets the system up by providing the email addresses of individuals in the community responsible for helping maintain data (referred to as data gatherers). A representative of the local Utilities Commission for example may be responsible for information about the power grid, whereas someone from the local Human Resources Development may be responsible for providing information about labour and wage rates.

The system may also be used to allow Economic Developers to collect information from the community in a standardized format—specifically the International Economic Development Council's set of economic development data standards. In this case, a Site Selector (they can remain anonymous if they wish) looking to relocate or open a businesses will put down some basic criteria for the type of city they are looking to relocate to, for example population, needs airport etc. They will also be able to request and rank other information from the data standard list.

When the Site Selector submits their request, the applicable data gatherers (or for that matter businesses or other organizations participating in the system) may be notified as needed. If they choose to respond, the Survey system is operable to automatically send a questionnaire to those responsible for data requesting the specific information that the Site Selector is looking for. The information is automatically assembled and returned to the Site Selector. Those who respond can also see where they have 'placed' vs. their competition.

In the process of doing this, the 1200 data points in the Data Standards list become more and more robust over time, based on the need for information. And it is done by spreading the word throughout the community. The previously onerous job for the Economic Developer is done for them by this system.

It is also possible to generate reports from the master database, as may be needed from time to time. An alphabetical list of municipality businesses, municipality businesses grouped by region, a sales report, a Canadian SIC report, U.S. SIC report, an employee size report, a postal code report, and a NAICS report. They can be provided in a number of tabular, graphical, text, cross tabular formats, or available for download for offline use or analysis. Further, statistical analyses can be performed using the data on the master database, as may be needed from time to time.

The system may be equipped with one or more search engine functions in order for users to access data in one or more of the records. In the event that some of the data records in the database are confidential to specific subsets of clients or users, a portion of the records of the master database can be marked as confidential. In this manner, a qualified subset of the clients is permitted to access the confidential records. Alternatively, the records may be accessible only to users of a predetermined security clearance level. For instance, a member of the general public may not be given access to records relating to employee members at business in a particular region whereas a member of a company considering establishing a presence in a municipal area may be given such clearance.

Figure 12A:
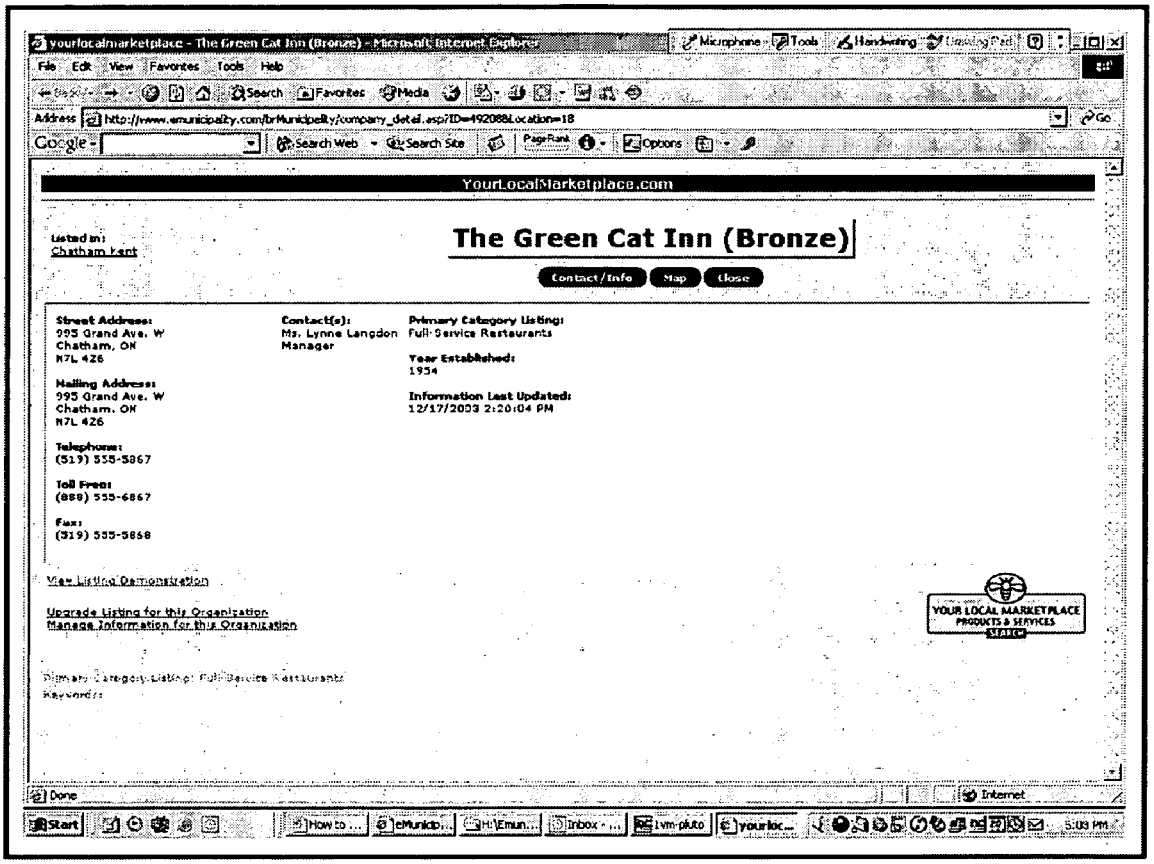
FIG. 12A is a computer screen printout from the software accessing the database of the system of FIG. 1, showing a first level of service.
Figure 12B:
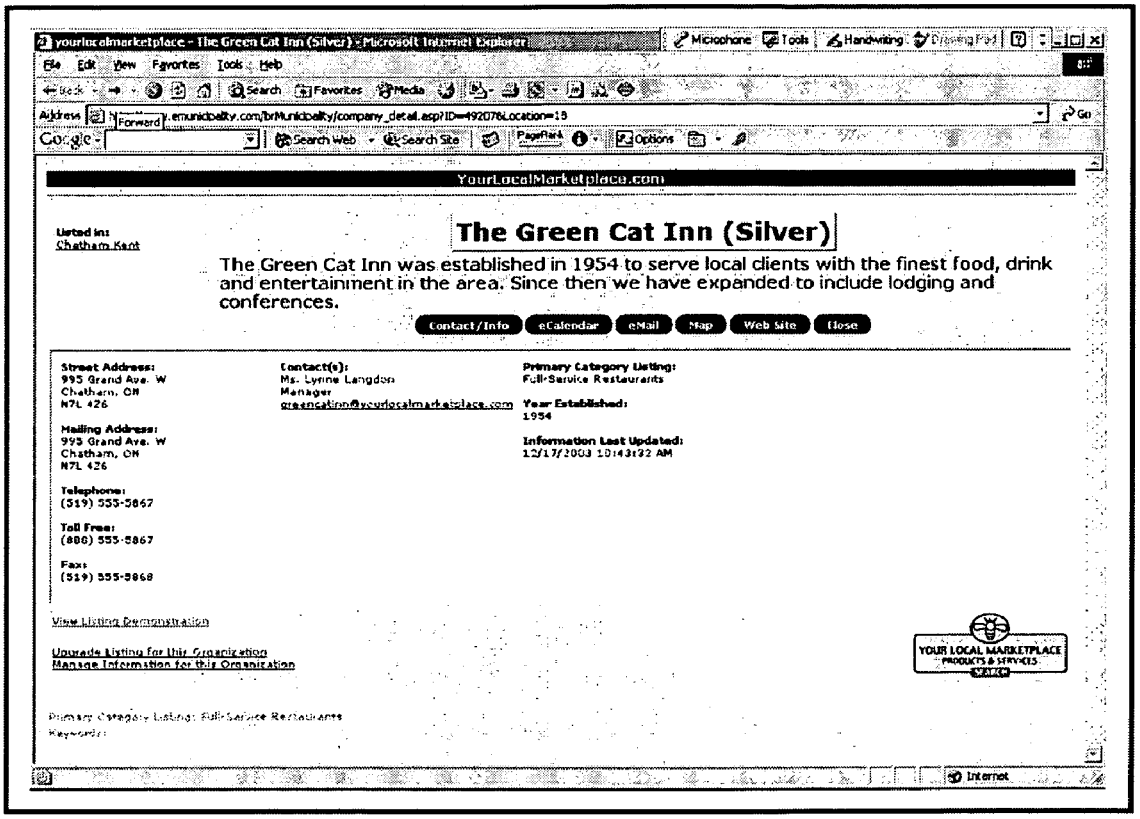
FIG. 12B is a computer screen printout from the software accessing the database of the system of FIG. 1, showing a second level of service; and, FIG. 12C is a computer screen printout from the software accessing the database of the system of FIG. 1, showing a third level of service.
Figure 12C:

Further, the system provides a method of operating a municipal database. In addition to the above discussed steps, the operation of a municipal database permits the collecting of a client fee from each the client having the client record in the master database, and also the collecting of a user fee from end users. As can be best seen in FIGS. 12A through 12C, the client fees are graduated according to a level of service provided to the client. The basic bronze level of service, as shown in FIG. 12A, provides for a basic web page that is linked to if it is identified in response to a search inquiry. This basis web page provides fundamental information about the business, such as business name, address, telephone number, facsimile number, contacts, type of business, year established, and recency of information. There are also links to contact information and a map. The enhanced silver level of service, as shown in FIG. 12B, provides for an enhanced web page that is linked to if it is identified in response to a search inquiry. This enhanced web page has the information shown in the basis web page, and additionally has an enticing header about the business. Also, additional links are included. The complete gold level of service, as shown in FIG. 12C, provides for a complete web page that is linked to if it is identified in response to a search inquiry. This complete web page also includes a more full and enticing story about the business, and a picture of part of the business. It generally provides all of the information that a client wants to present about his business.

It is also contemplated that users, or in other words those who perform search inquiries on the database, could be charged user fees. These user fees could also be graduated according to a level of service provided to the user.

It can therefore be seen that the present invention also provides a method of generating revenue from activities associated with a municipality.

Figure 11A:
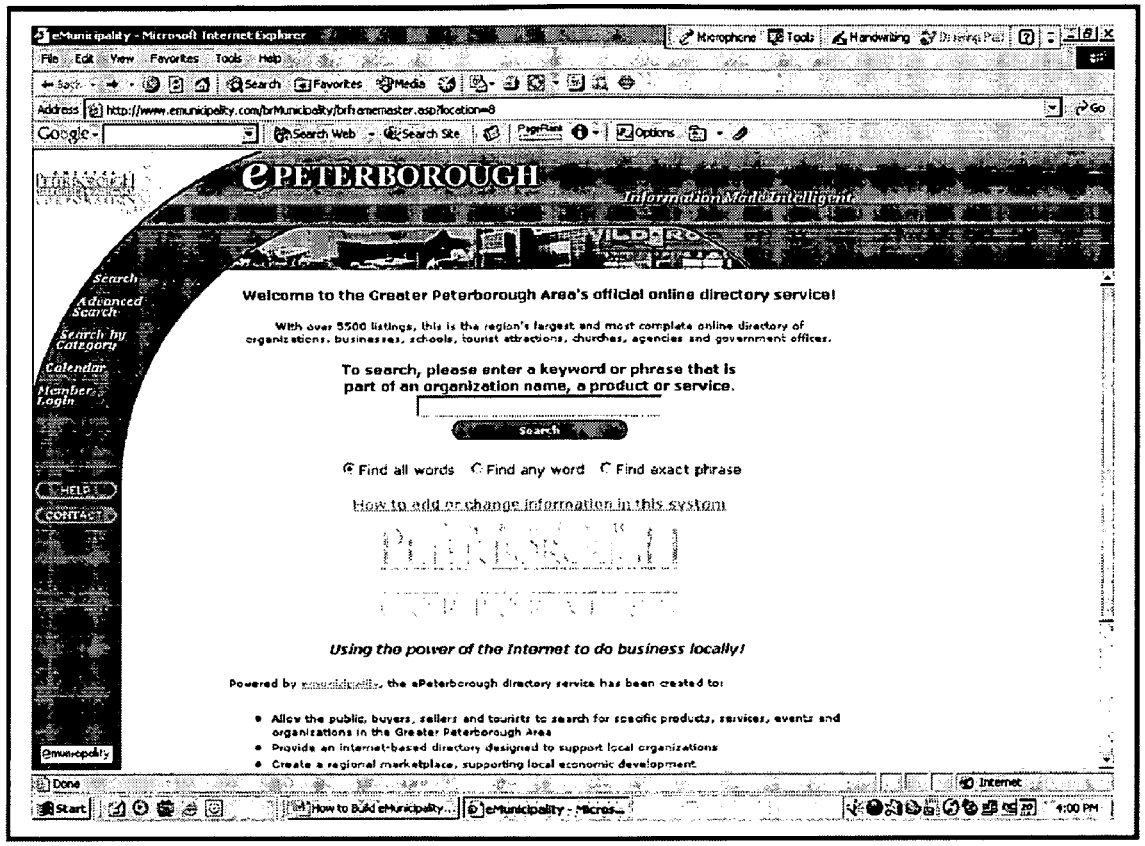
FIG. 11A is a computer screen printout of an Internet page used by a user searching for information in the database of the system of FIG. 1, showing a first skin.
Figure 11B:
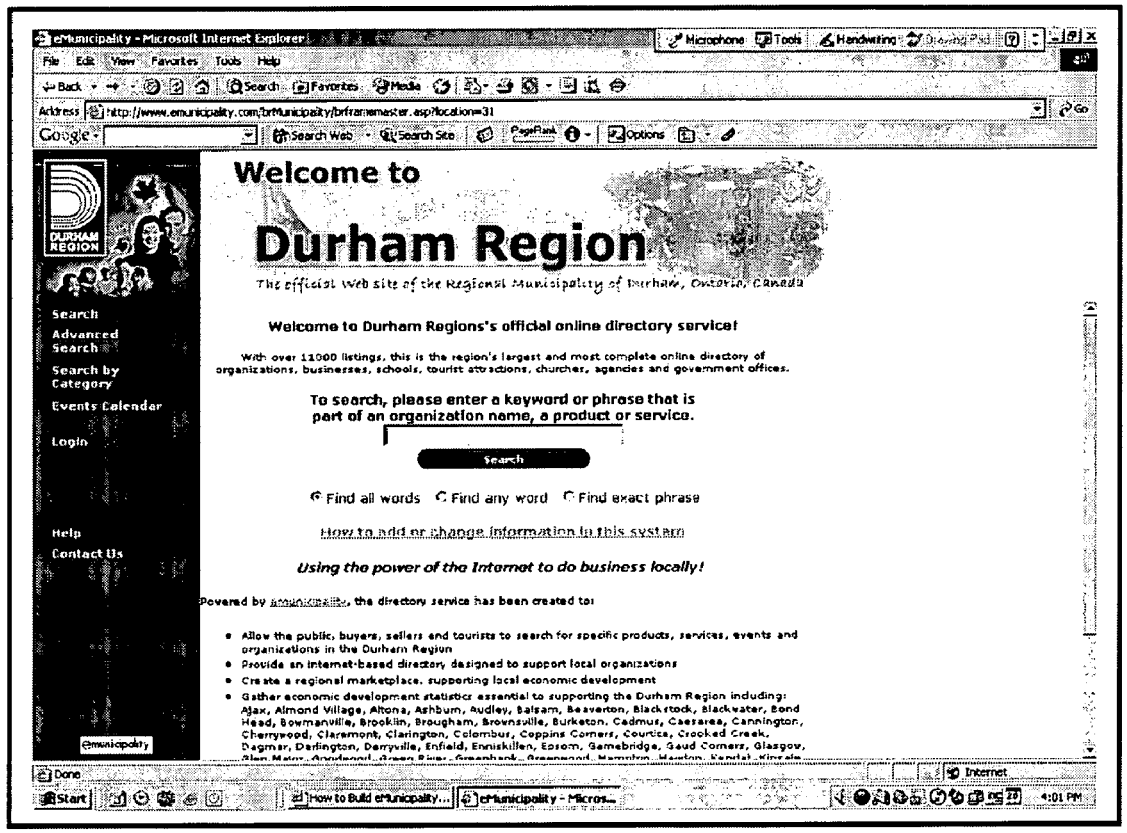
FIG. 11B is a computer screen printout of an Internet page used by a user searching for information in the database of the system of FIG. 1, showing a second skin.

In order to make the database user friendly for users, and also for clients, the skin or "look and feel" of the database software can be created to appear similar to a corresponding web page on the portal of the municipality, two examples of which are shown in FIGS. 11A and 11B. Skin creation involves the replication of the look and feel of the Municipality' web site, preferably using a templated structure. By maintaining the look and feel of the Municipality' web site, we are able to be seamless in the eyes of businesses and end users as they move back and forth between our site and the Economic Developer's.

As can be understood from the above description and from the accompanying drawings, the present invention provides a municipal database that is affordable to acquire and maintain, a municipal database wherein the data are kept current by end users, a municipal database wherein the data are complete and accurate, a method of operating a municipal database wherein search results from the database are presented in a order of recency of update, a municipal database wherein revenue is generated for the municipality, all of which features are unknown in the prior art.

This system lends itself to providing windows and or views to other systems and applications that can be seen without having to leave the system. Parameters can also be passed from this system to automatically leverage the third party system. For instance GIS applications, like MapPoint, where parameters are passed through custom connectors to display an accurate location map. Third party websites complete with all of there specific functionality can also be leveraged directly through this system. Supporting links may also be made readily available where it is appropriate that the user actually leave the system.

The systems described herein may include a programmed logic controller or some other form of controller. It may be included in a software program configured to run on a general purpose computer, such as personal computer, or on a more substantial computer mainframe, which is operable to work within a network, for client records to be uploaded to a central database. The network may thus involve several general purpose computers, for example those sold under the trade names APPLE™ or IBM™, or clones thereof, which are programmed with operating systems known by the trade names WINDOWS™, LINUX or other well known or lesser known equivalents of these. The system may involve pre-programmed software using a number of possible languages or a custom designed version of a programming software sold under the trade name ACCESS™ or similar programming software. The computer network may be a wired local area network, or a wide area network such as the Internet, or a combination of the two, with or without added security, authentication protocols, or under "peer-to-peer" or "client-server" or other networking architectures. The network may also be a wireless network or a combination of wired and wireless networks. The wireless network may operate under frequencies such as those dubbed 'radio frequency' or "RF" using protocols such as the 802.11, TCP/IP, BLUE TOOTH and the like, or other well known Internet, wireless, satellite or cell packet protocols. The system may, alternatively, include a single custom built computer which is dedicated to the function of the system alone.

The individual components shown in outline or designated by blocks in the attached Drawings are all well-known in the computer programming arts, and their specific construction and operation are not critical to the operation or best mode for carrying out the invention.

All U.S. and foreign patent documents discussed above are hereby incorporated by reference into the Detailed Description of the Preferred Embodiment.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A computer implemented method of operating a community database, said method comprising the steps of:
   providing a first source database having data fields therein, said data fields containing data representative of a plurality of client records for a plurality of clients in a community;
   providing a second source database having data fields therein, said data fields containing data representative of a plurality of entity records for a plurality of entities in the community, wherein at least some of the clients of the first source data base are common with corresponding entities in the second source database;
   comparing data in a predetermined client record in the first source database with at least one of the entity records in the second source database to determine a correspondence there between, including the steps of:
      assigning a weighting value to the fields for the predetermined client record in the first source database and to the fields of at least one predetermined entity record in the second source database;
      calculating a percentage value of a portion of the data in a field of the first source database that matches the data in a corresponding field of the second source database;
      calculating a field value as a product of the weighting value and the percentage value for each data field for the predetermined client record;
      summing the field values for the data fields of the predetermined client record to create a match value; and
      establishing a correspondence based on the match value;
   and for each correspondence, reconciling the data in the first and and/or second source databases to optimize the data in each field of the corresponding client record in the first source database to form a reconciled client record; and;
   storing the reconciled client record.

2. A method as defined in claim 1, further comprising the step of providing a first interface for a client to access and/or update a corresponding client record.

3. A method as defined in claim 2, further comprising the step of verifying and/or approving a proposed update to a client record by the client.

4. A method as defined in claim 3, further comprising the step of collecting a client fee from one or more of the clients, wherein the client fee is graduated according to a level of service provided to the client.

5. A method as defined in claim 2, further comprising the steps of providing a second interface for one or more users for performing one or more search engine functions in the client records, receiving a search inquiry from at least one of the users, and presenting a listing of client records relevant to the search inquiry.

6. A method as defined in claim 5, further comprising the step of collecting a user fee from end users, wherein the user fee is graduated according to a level of service provided to the user.

7. A method as defined in claim 6, further comprising the step of providing a date and/or time stamp for each reconciled client record, updating the date and/or time stamp after an update to the client record; and organizing the listing of records in an order according to a value for each date and/or time stamp.

8. A method as defined in claim 3, further comprising the step of issuing an invitation to a client to review and/or update a corresponding client record.

9. A method as defined in claim 3, further comprising the steps of dispatching a plurality of survey messages to a corresponding plurality of clients, providing in each survey message a plurality of answer fields to receive data from the corresponding client, receiving a reply survey message from at least one of said corresponding clients and updating a corresponding client record according to data in one or more of the answer fields.

10. A method as defined in claim 5, further comprising the steps of providing a portal for the community, and providing the first and/or second interfaces with a skin to correspond visually with the portal.

11. A method as defined in claim 1, further comprising the step of providing each client record with a user access filter field, providing a filter value to the field; and permitting access to the data in the client record by users corresponding to the filter value.

12. A method as defined in claim 1, further comprising the step of providing each client record with a plurality of filter fields, a first of the fields corresponding to a first group of users, and a second of the field corresponding to a second group of users, and permitting access to a selected portion of the data in the client record by users according to the first and/or second filter values.

13. A method as defined in claim 3, further comprising the step of dispatching an update message to one or more users, the update message containing data representative of a message that a client record has been updated, and/or data representative of the updated client record.

14. A method as defined in claim 1, wherein in an event of a correspondence, further comprising the steps of dispatching a query message to select a field value corresponding either to a field value in the client record or a corresponding field value in a corresponding entity record, and in the event of an affirmative response to the query message, reconciling the field value for the client record and storing a selection value in a selection field representative thereof.

15. A method as defined in claim 14, wherein in a subsequent event of a correspondence, further comprising the steps of reading the selection value and reconciling the field value for the predetermined client record, according to the selection value.

16. A method as defined in claim 14, wherein the query message is dispatched to a client, and/or a user, and/or an agent of the community.

17. A method as defined in claim 12, further comprising the steps of providing the client record with at least one first coordinate field containing data representative of first client coordinate data according to the first filter, and at least one second coordinate field containing second client coordinate data according to the second filter.

18. A computer implemented system for operating a municipal database, comprising:
   first source database means having data fields therein, said data fields containing data representative of a plurality of client records for a plurality of clients in a community;
   second source database means having data fields therein, said data fields containing data representative of a plurality of entity records for a plurality of entities in the community, wherein at least some of the clients of the first source data base are common with corresponding entities in the second source database;
   comparing means for comparing the data for each client record in said first source database means with the data for at least one of the entity records in said second source database means to determine a correspondence between a predetermined client record and a corresponding entity record; said comparing means being operable to:
   scrub the data in said first source database and said second source database and indexing the data by setting the data to a comparison standard;
   compare data in a predetermined client record in the first source database with at least one of the entity records in the second source database to determine a correspondence there between, including the steps of:
   assign a weighting value to the fields for the predetermined client record in the first source database and the second source database;
   calculate a percentage value of a portion of the data in a field of the first source database that matches the data in a data field of the second source database;
   calculate a field value as a product of the weighting value and the percentage value for each data field for the predetermined client record;
   sum the field values for the data fields of the predetermined client record to create a match value; and
   establish a correspondence based on the match value;
   data reconciliation means being operable, for each correspondence to reconcile the data in the first and and/or second source databases to optimize the data in each field of the corresponding client record in the first source database to form a reconciled client record; and,
   storage means for storing the reconciled client record.

* * * * *